US010735907B2

(12) United States Patent
Lanes et al.

(10) Patent No.: US 10,735,907 B2
(45) Date of Patent: Aug. 4, 2020

(54) WIRELESS GATEWAY RELAY SYSTEM AND METHOD

(71) Applicant: Geoforce, Inc., Coppell, TX (US)

(72) Inventors: Troy Edwin Lanes, Bozeman, MT (US); Gary Allen Naden, Bozeman, MT (US)

(73) Assignee: Geoforce, Inc., Coppell, TX (US)

( * ) Notice: Subject to any disclaimer, the term of this patent is extended or adjusted under 35 U.S.C. 154(b) by 0 days.

(21) Appl. No.: 16/394,775

(22) Filed: Apr. 25, 2019

(65) Prior Publication Data

US 2019/0253843 A1 Aug. 15, 2019

Related U.S. Application Data

(62) Division of application No. 15/880,450, filed on Jan. 25, 2018, now Pat. No. 10,382,897.

(51) Int. Cl.

| *H04W 4/029* | (2018.01) |
| *G06Q 10/08* | (2012.01) |
| *H04W 88/16* | (2009.01) |
| *H04B 17/318* | (2015.01) |

(52) U.S. Cl.
CPC ........ *H04W 4/029* (2018.02); *G06Q 10/0833* (2013.01); *H04B 17/318* (2015.01); *H04W 88/16* (2013.01)

(58) Field of Classification Search
CPC ..... H04W 4/029; H04W 88/16; H04W 64/00; H04B 17/318; G06Q 10/0833
See application file for complete search history.

(56) References Cited

U.S. PATENT DOCUMENTS

| 6,977,612 | B1 | 12/2005 | Bennett | |
|---|---|---|---|---|
| 8,874,713 | B1 | 10/2014 | Herring et al. | |
| 9,049,641 | B2* | 6/2015 | Wible | H04W 48/04 |
| 9,119,013 | B1* | 8/2015 | Scheffel | H04W 4/00 |
| 9,713,116 | B2* | 7/2017 | Wible | H04W 48/04 |
| 10,142,777 | B1 | 11/2018 | Wulff | |
| 2002/0177476 | A1 | 11/2002 | Chou | |
| 2003/0050038 | A1* | 3/2003 | Haave | B60R 25/102 |
| | | | | 455/404.1 |
| 2005/0242947 | A1* | 11/2005 | Burneske | G01C 21/005 |
| | | | | 340/539.13 |
| 2006/0200560 | A1 | 9/2006 | Waugh et al. | |

(Continued)

*Primary Examiner* — Brandon J Miller

(57) ABSTRACT

A gateway, a tracking device, a server, and a method for tracking assets are provided. The method includes receiving a message from a tracking device. The received message includes an identification parameter associated with the tracking device and indicates at least one of a null location or a location of the tracking device. The method also includes determining whether the received message indicates a valid location of the tracking device, based on whether the location of the tracking device is within a predetermined range of the electronic device. The method also includes augmenting the received message with at least one of location information of the electronic device, and identification information of the electronic device when the received message indicates the null location or the location of the tracking device is not the valid location of the tracking device. The method further includes transmitting the message to a server.

20 Claims, 8 Drawing Sheets

(56) References Cited

U.S. PATENT DOCUMENTS

| | | | |
|---|---|---|---|
| 2012/0040665 A1* | 2/2012 | Liu | H04W 4/80 |
| | | | 455/426.1 |
| 2012/0250610 A1* | 10/2012 | Budampati | H04L 67/125 |
| | | | 370/328 |
| 2013/0147617 A1 | 6/2013 | Boling et al. | |
| 2015/0145650 A1* | 5/2015 | Levan | G06Q 10/0833 |
| | | | 340/10.1 |
| 2015/0332573 A1* | 11/2015 | Selmanovic | H04W 4/50 |
| | | | 455/457 |
| 2016/0219552 A1* | 7/2016 | Chen | H04W 64/006 |
| 2017/0006419 A1 | 1/2017 | Rajala et al. | |
| 2017/0332199 A1* | 11/2017 | Elliott | H04W 4/023 |
| 2018/0014250 A1* | 1/2018 | de Barros Chapiewski | |
| | | | H04W 52/028 |
| 2018/0189528 A1 | 7/2018 | Hanis et al. | |

\* cited by examiner

WIRELESS GATEWAY RELAY SYSTEM AND METHOD

CROSS-REFERENCE TO RELATED APPLICATION AND CLAIM OF PRIORITY

This application is a divisional of U.S. patent application Ser. No. 15/880,450 filed on Jan. 25, 2018. U.S. patent application Ser. No. 15/880,450 is hereby incorporated by reference in its entirety.

TECHNICAL FIELD

This disclosure relates generally to asset tracking systems. More specifically, this disclosure relates tracking remote objects using a tracking device and a gateway when the tracking device is unable to receive location information or access a network for data delivery.

BACKGROUND

Many industries, such as the oil and gas industry, are supplied with equipment that is overseen by an asset management system. The equipment is often transported in various types of containers. Containers can include boxes, crates, tanks, pallets, and the like. Global Navigation Satellite System (GNSS) tracking devices are increasingly used throughout the various supply chain endeavors, to locate or remotely monitor field equipment. The benefits of this technology include improved operational efficiency, increased utilization, improved service quality, and enhanced maintenance practices. GNSS tracking devices typically utilize wireless backhaul data links for sending data to a remote monitoring or control facility. The wireless links often include communication links over cellular communication networks, satellite communication networks, or local WiFi communication networks.

SUMMARY

This disclosure provides wireless gateway relay system and method.

In a first embodiment, an electronic device is provided. The electronic device includes a transceiver and a processor. The transceiver is configured to receive a message from a tracking device associated with an asset. The received message includes an identification parameter associated with the tracking device. The transceiver is also configured to transmit the message to a server. The electronic device also includes a processor. The processor is configured to determine whether the received message indicates a location of the tracking device. When the location of the tracking device is a null location, the processor is configured to augment the received message with at least one of location information of the electronic device and identification information of the electronic device In a second embodiment, an electronic device is provided. The electronic device includes a location receiver, a communication unit and a processor. The location receiver is configured to receive location information of the tracking device. The communication unit is configured to transmit through a wide area network and transmit through a local area network. The processor is configured to attempt to ascertain the location information of the tracking device. The processor is also configured to generate a first message that indicates the location of the tracking device or a null location based on a failure to ascertain the location information of the tracking device. The processor is also configured to generate a second message that indicates the location of the tracking device or a null location based on a failure to ascertain the location information of the tracking device. The first message is transmitted through the wide area network to a remote server when the wide area network is available. The second message is transmitted through the local area network to the remote server when the local area network is available.

In a third embodiment, a method is provided. The method includes receiving a message from a tracking device associated with an asset. The received message includes an identification parameter associated with the tracking device. The method also includes determining whether the received message indicates a location of the tracking device. In response to determining the location of the tracking device is a null location, augmenting the received message with at least one of location information of an electronic device, and identification information of the electronic device. The method further includes transmitting the message to a server.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged wireless communication system or device.

Figure 1:
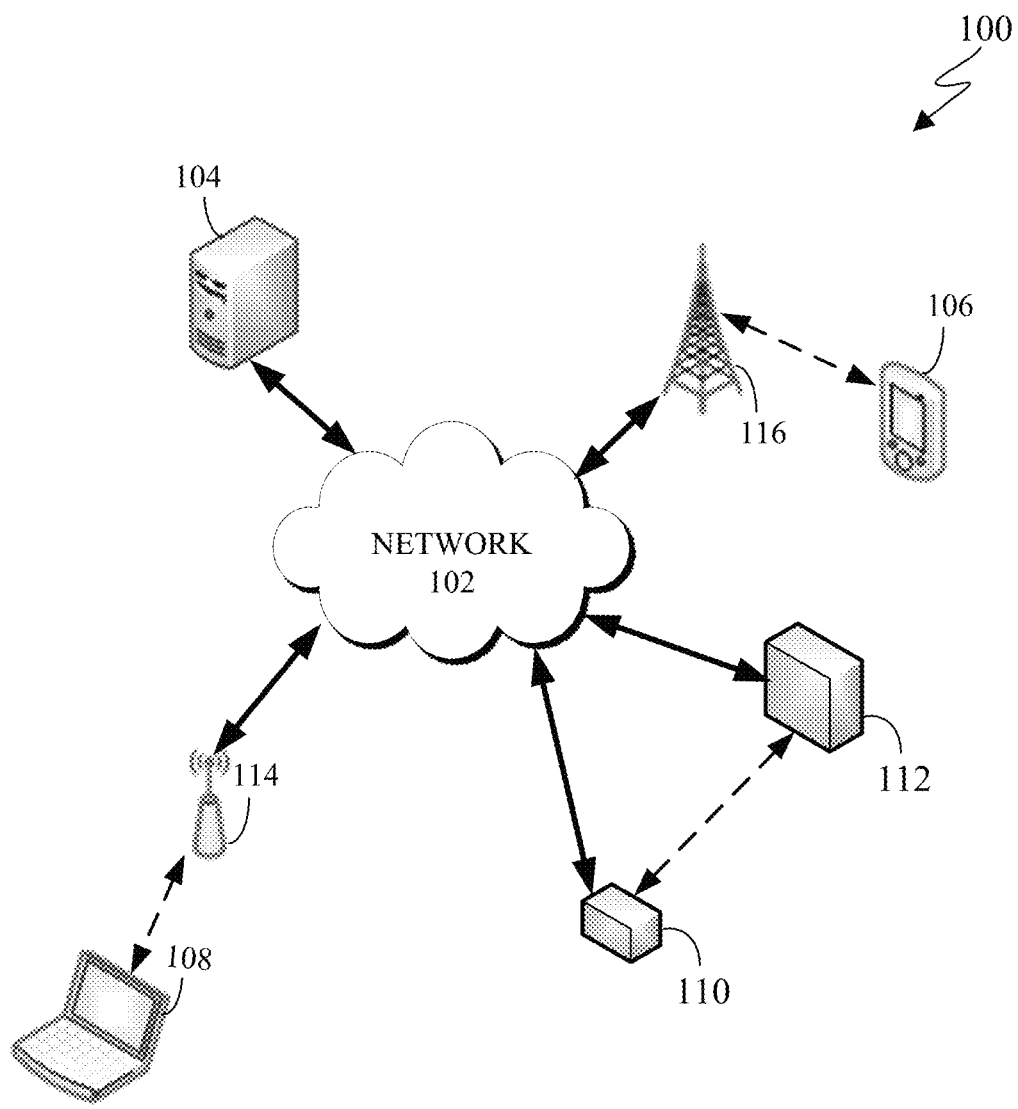
FIG. 1 illustrates an example communication system in accordance with embodiments of the present disclosure.

FIG. 1 illustrates an example computing system 100 according to this disclosure. The embodiment of the system 100 shown in FIG. 1 is for illustration only. Other embodiments of the system 100 can be used without departing from the scope of this disclosure.

The system 100 includes network 102 that facilitates communication between various components in the system 100. For example, network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

The network 102 facilitates communications between a server 104 and various electronic devices 106-112. The client devices 106-112 may be, for example, a smartphone, a tablet computer, a laptop, a personal computer, a wearable device; a tracking device, or a gateway or a combination thereof. The server 104 can represent one or more servers. Each server 104 includes any suitable computing or processing device that can provide computing services for one or more client devices. Each server 104 could, for example, include one or more processing devices, one or more memories storing instructions and data, and one or more network interfaces facilitating communication over the network 102. As described in more detail below, the server 104 manages assets by receiving locations of tracking devices associated with each asset.

Each electronic device 106-112 represents any suitable computing or processing device that interacts with at least one server or other computing device(s) over the network 102. In this example, the client devices 106-112 include a mobile telephone or mobile device 106 (such as a smartphone), a laptop computer 108, a tracking device 110, and a gateway 112. However, any other or additional electronic devices could be used in the system 100.

In this example, some electronic devices 106-112 communicate indirectly with the network 102. For example, the mobile device 106 communicates via one or more base stations 116, such as cellular base stations or eNodeBs (eNBs). Also, laptop computer 108 can communicate via one or more wireless access points 114, such as IEEE 802.11 wireless access points. As described in more detail below, the tracking device 110 can communicate directly with network 102, and the gateway 112. Similarly, the gateway 112 can communicate directly with network 102 and the tracking device 110. In certain embodiments, the tracking device 110 communicates with network 102 and the gateway 112 through one or more base stations 116, or one or more wireless access points 114, or a combination thereof. In certain embodiments, the tracking device 110 communicates with the gateway 112 through a short range frequency communication channel such as BLUETOOTH, or WI-FI. Note that these are for illustration only and that each electronic device 106-112 could communicate directly with the network 102 or indirectly with the network 102 via any suitable intermediate device(s) or network(s).

In certain embodiments, the mobile device 106, the laptop computer 108, the tracking device 110, and the gateway 112 can transmit information securely and efficiently to another device, such as, for example, the server 104. The gateway 112 (or any other client device 106-112) can trigger the information transmission between itself and server 104. In certain embodiments, mobile device 106 and laptop computer 108 can function as a tracking device or a gateway.

Although FIG. 1 illustrates one example of a system 100, various changes can be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

The processes and systems provided in this disclosure allow for the tracking device 110, or the gateway 112, to provide location information of an asset. In certain embodiments, the tracking device 110 is affixed to an asset. The tracking device 110 ascertains location information and transmits a message to a server that indicates the location of the asset.

The tracking device 110 may be unable to ascertain location information, such as when the tracking device 110 is within a building or inside a cargo vehicle. In certain embodiments, the tracking device 110 transmits a message with a location to a gateway, similar to the gateway 112. The message transmitted by the tracking device 110 can include a null location, when then tracking device is unable to ascertain a location. In certain embodiments when the tracking device 110 transmits a null location message, the gateway 112 augments the message with the location of the gateway 112 and transmits the message to indicate an approximate location of the asset.

Figure 2:
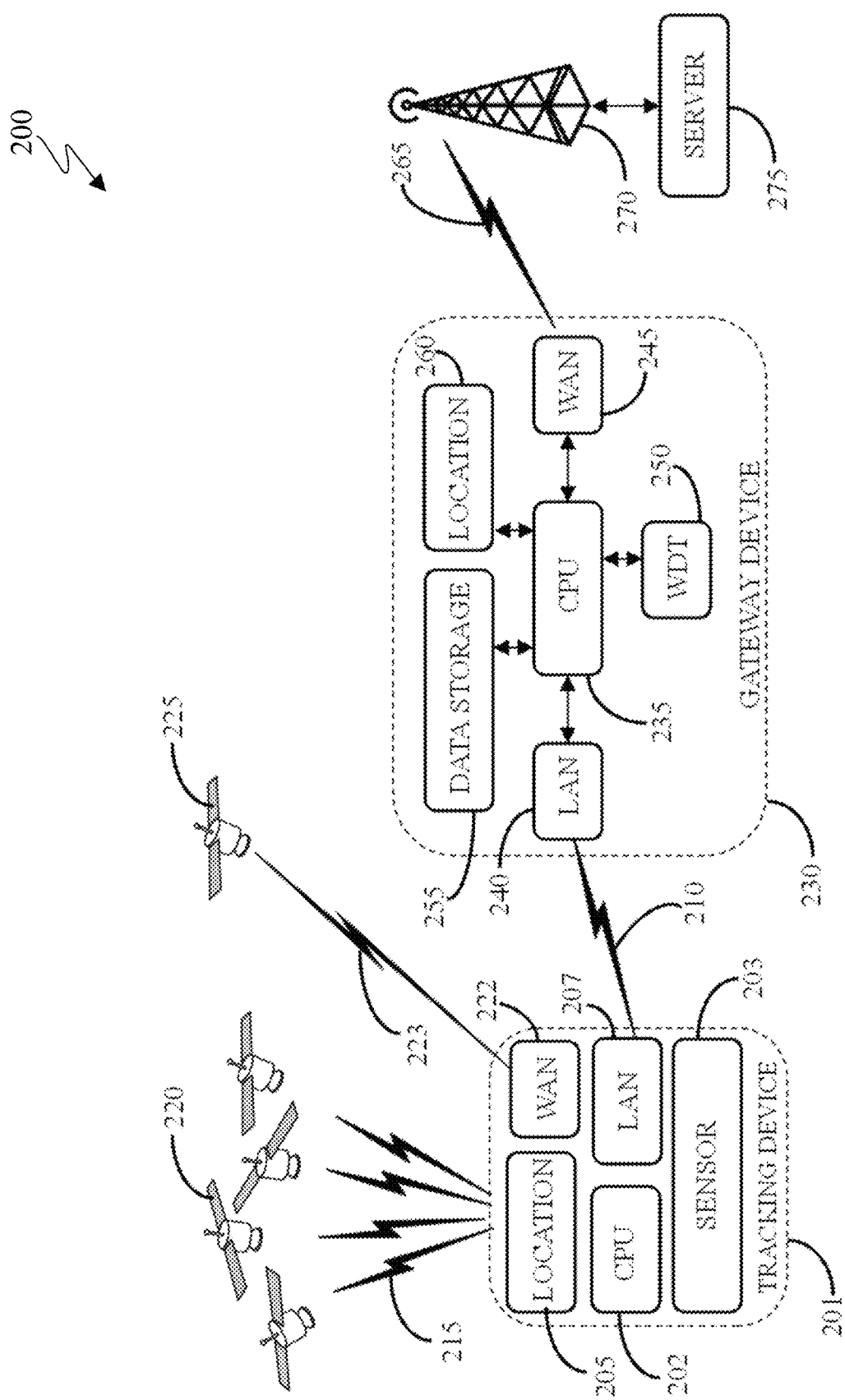
FIG. 2 illustrates example electronic devices in a computing system in accordance with an embodiment of the present disclosure.

FIG. 2 illustrates example devices in a computing system in accordance with an embodiment of this disclosure. In particular, FIG. 2 illustrates environment 200 including an example tracking device 201, a gateway device 230, and a server 275. The tracking device 201, the gateway device 230 and the server 275 could each represent one or more of the electronic devices 104-112 of FIG. 1. In certain embodiments, the tracking device 201, represents the tracking device 110 of FIG. 1. In certain embodiments, the gateway device 230 represents the gateway 112 of FIG. 1. In certain embodiments the server 275 represents the server 104 of FIG. 1.

FIG. 2 illustrates an example expanded device level diagram of a computing system in accordance with an embodiment of this disclosure. In certain embodiments, FIG. 2 illustrates the system of FIG. 1 with an expanded view of the example tracking device 110 (such as tracking device 201) and gateway 112 (such as gateway device 230).

FIG. 2 illustrates implementation of a tracking device 201 and gateway device 230 in accordance with an embodiment of this disclosure. The embodiment of the tracking device 201 and the gateway device 230 shown in FIG. 2 are for illustration only and other embodiments could be used without departing from the scope of this disclosure. The electronic devices used in the present invention can come in a wide variety of configurations, and FIG. 2 does not limit the scope of this disclosure to any particular implementation of an electronic device.

Tracking device 201 is a location acquisition, and tracking device used in asset management and supply chain systems. The tracking device 201 can be any device including a location means 205, central processing unit (CPU) 202, WAN interface 222 and local area network interface 207. In certain embodiments, tracking device 201 includes sensors 203 or interfaces to sensors 203. These functions may be embedded in many electronic devices that could serve the purpose described herein, such as, for example, a wireless terminal, a desktop, a mobile device (similar to mobile device 106 of FIG. 1), a laptop (similar to laptop computer 108 of FIG. 1), a tablet computer, a tracking device (similar to tracking device 110 of FIG. 1, and the like.

Gateway device 230 is an electronic device that provides communication interfaces that interface with any number of tracking devices 201 and any number of WAN interface 245 to connect to WAN 270 via communication 265. In certain embodiments, gateway device 230 is a stationary device. In certain embodiments, gateway device 230 is a mobile device. As depicted in FIG. 2, a gateway device 230 includes a LAN interface 240, WAN interface 245, CPU 235 with data storage 255. In certain embodiments, the gateway device 230 includes a location means 260 or a watch dog timer (WDT) 250, or both.

Environment 200 depicts the general operation of a single tracking device 201 and a single gateway device 230 in an operational model of the present invention. Multiple tracking devices and multiple gateway devices are also an implementation of the present disclosure. Tracking device 201 contains location means 205 for ascertaining device location, via GNSS, inertial navigation, proximity detection or any other method for ascertaining location. In certain embodiments, the tracking device 201 includes a GNSS receiver that collects communication 215 from a multiplicity of GNSS satellites 220 for ascertaining location. A GNSS receiver can receive geolocation information from global navigation satellites, provided the GNSS receiver has an unobstructed view to multiple satellites. A GNSS receiver is able to calculate the location of the tracking device 201. The tracking device 201 can transmit the location information through WAN 222 or LAN 207 or both. For example, tracking device 201 can transmit the location information through the WAN interface 222 to a satellite 225 using communication 223. The satellite 225 as depicted represents the WAN for global communication of the tracking device 201. WAN interface 222 is not limited to communicating with satellite 225 as other WANs such as cellular, internet or public, or proprietary long-range radio systems are equally suitable. The tracking device 201 also includes a LAN interface 207 that provides via communication 210 to the nearby gateway device 230 that contains compatible local area network interface 240. Communication 210 is a short range communication, that has a limited distance. In certain embodiments, communication 210 is limited to 1,000 meters. Communication 210 between LAN interface 207 and LAN interface 240 can include any short-range radio signals such as BLUETOOTH, BLUETOOTH LOW-ENERGY (BLE), WiFi, ZIGBEE, Radio Frequency identification (RFID), or other proprietary short range signals. In certain embodiments, tracking device 201 receives location information and transmits a message via WAN interface 222 or LAN interface 207 or both. In certain embodiments, tracking device 201 receives location information as well as is capable of transmitting and receiving messages, similar to a transceiver, via WAN interface 222 or LAN interface 207 or both. In certain embodiments, tracking device 201 transmits the same location message through the interfaces of both WAN 222 and LAN 207 in order the message to reach the server 275. The tracking device 201 utilizes a CPU 202 that controls and manages all the operations, computations, data manipulation and storage as well as operational and communication means of the device.

In certain embodiments, the tracking device 201 includes one or more sensors 203 that meter a physical quantity or detect an activation state of the tracking device 201 and convert metered or detected information into an electrical signal. For example, sensor 203 can include one or more buttons for touch input (located on the tracking device 201), one or more cameras, a gyroscope or gyro sensor, an air pressure sensor, a magnetic sensor or magnetometer, an acceleration sensor or accelerometer, a proximity sensor, a color sensor (such as a Red Green Blue (RGB) sensor), a temperature/humidity sensor, an illumination sensor, an Ultraviolet (UV) sensor, an iris sensor, a fingerprint sensor, a radiation sensor (such as a Geiger Counter), and the like. The sensor 203 may also be a communication interface to a nearby sensor being monitored by tracking device 201. The sensor 203 can further include a control circuit for controlling at least one of the sensors included therein. One or more of these sensors 203 can be used to detect ambient atmospheric conditions at or around the tracking device 201, proximity to another electronic device, physical impacts that can damage the asset associated with the tracking device 201, and the like. Any of these sensor(s) 203 may be located within the tracking device 201, or in communication with the tracking device 201.

The gateway device 230 of FIG. 2 operates as an alternate communication means for a tracking device 201 to connect with a wide area network. In the event that the tracking device 201 fails to connect to the primary WAN through satellite 225, (through WAN interface 222 and communication 223), the tracking device 201, can connect to the alternate WAN 270 through communication 210 with the gateway device 230, via LAN interface 207 of the tracking device 201 to the LAN interface 240 of the gateway device 230.

The gateway device contains a CPU 235 that manages all the operations, computations, data manipulation and storage as well as communication means of the device. The gateway device 230 bridges the communication between the tracking device 201 and a WAN 270 using communication 210 and 265. The gateway device 230 may also use data storage 255 to provide data processing and intelligent processing of tracking device 201 messaging. The data storage 255 could include a random access memory (RAM), a Flash memory or other read-only memory (ROM). In certain embodiments, the gateway device 230 includes a location means similar to location means 205 of tracking device 201 to augment a null location received from the tracking devices 201. In certain embodiments, a null location is received from the tracking devices 201 when the tracking devices 201 cannot ascertain its location via location means 205. In certain embodiments, the gateway device 230 includes location information stored in data storage 255, inferred by the server 275, or a location ascertained via location means 260 to augment a null location received from tracking devices 201. In certain embodiments, the gateway device 230 includes location information that is stored in data storage 255, inferred by the server 275, or a location ascertained via location means 260, or a combination thereof, to augment a valid location received from tracking devices 201 in order to favor and place the tracking device 201 at the gateway location reported. Location augmentation is an effective method for proximity locating tracking device 201 due to the limited range of the local area network. Location 260 is similar to location 205 of the tracking device 201. In certain embodiments, the gateway device 230 includes a WDT 250 to reset the gateway device 230 upon detection of anomalous operation. The WDT 250 is an electronic timer that is utilized to detect and recover from a malfunction of the gateway device 230. In certain embodiments, the CPU 235 issues a ping to the WDT 250 at a predetermined period. If the WDT 250 does not receive the ping, then the WDT 250 resets to the gateway device 230. In certain embodiments the WDT 250 is external to the gateway device.

The server 275 represents the system information repository that collects data from any number of tracking devices 201 and gateway devices 230 or any number of WANS such as satellite 225, and WAN 270. While FIG. 2 depicts wide area networks as satellite or cellular, any effective method for collecting information into server 275 is applicable in the present invention Although FIG. 2 illustrates example electronic devices such as tracking device 201, gateway device 230 and server 275, various changes can be made to FIG. 2. For example, various components in FIG. 2 could be combined, further subdivided, or omitted, and additional components could be added according to particular needs. As a particular example, the CPU 235 could be divided into multiple processors, such as one or more central processing units (CPUs) and one or more graphics processing units (GPUs). In addition, as with computing and communication networks, electronic devices (such as, tracking device 201, and gateway device 230) and servers (such as, server 275) can come in a wide variety of configurations, and FIG. 2 does not limit this disclosure to any particular electronic device or server.

Figure 3:
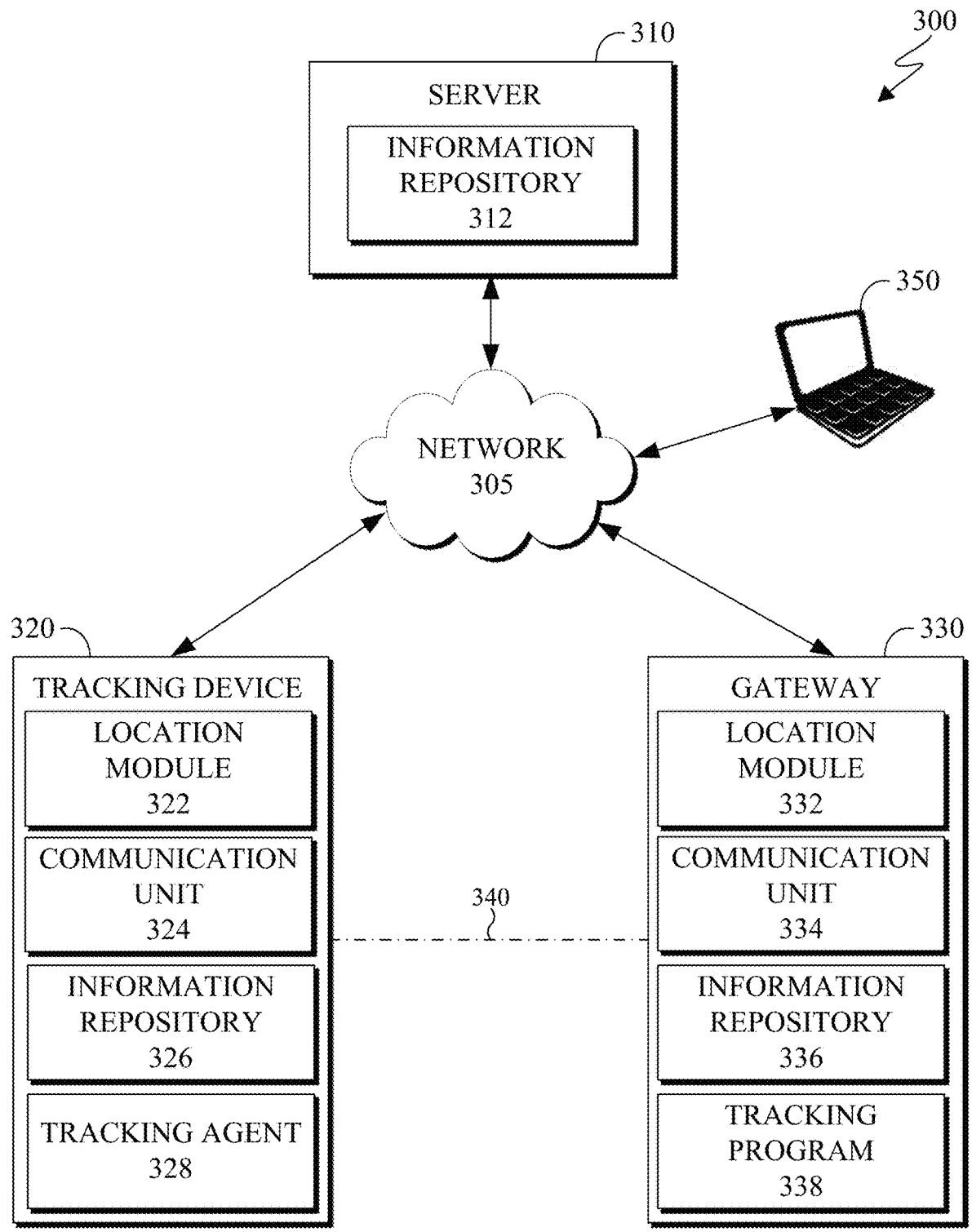
FIG. 3 illustrates an example block diagram in accordance with an embodiment of the present disclosure.

FIG. 3 illustrates an example block diagram of a communication system in accordance with an embodiment of this disclosure. The system architecture 300 includes a server 310, a tracking device 320, and a gateway 330 in communication over network 305. The embodiment of the system architecture 300 shown in FIG. 3 is for illustration only. Other embodiments could be used without departing from the scope of the present disclosure.

System architecture 300 illustrates a high-level overview of an embodiment of the present disclosure to track assets over network 305. Network 305 can be configured similar to network 102 of FIG. 1. Server 310 can be configured similar to server 104 of FIG. 1, and server 275 of FIG. 2. Tracking device 320 can be configured similar to any of the one or more client devices 106-112 of FIG. 1 (such as tracking device 110), and can include internal components similar to that of tracking device 201 of FIG. 2. Gateway 330 can be configured similar to any of the one or more client devices 106-112 of FIG. 1 (such as gateway 112) and can include internal components similar to that of gateway device 230 of FIG. 2.

Network 305 is used to provide communication between the server 310 the tracking device 320 and the gateway 330. Network 305 can be a short range communication network, personal area network (PAN), Local Area Networks (LANs), Wireless Local Area Networks (WLANs), the Internet, the Public Switched Telephone Network (PSTN), WAN such as public cellular service as well as other wireless networks. Network 305 may also be the Internet, representing a worldwide collection of networks and gateways that use Transmission Control Protocol/Internet Protocol (TCP/IP) protocols to communicate with one another. Network 305 can include a variety of connections, such as, wired, wireless or fiber optic connections. Network 305 provides communication similar to the communication 223 and 265 of FIG. 2

Server 310 can represent one or more local servers, one or more tracking device servers, or one or more asset management servers. Server 310 can be a web server, a server computer such as a management server, or any other electronic computing system capable of sending and receiving data. In certain embodiments, server 310 is a "cloud" of computers interconnected by one or more networks, where server 310 is a computing system utilizing clustered computers and components to act as a single pool of seamless resources when accessed through network 305. Server 310 can include an information repository 312. In certain embodiments, the server 310 includes a communications interface, and at least one input/output (I/O) unit.

Server 310 can include a communications interface that supports communications with other systems or devices. For example, the communications interface could include a network interface card or a wireless transceiver facilitating communications over the network 305. The communications interface can support communications through any suitable physical or wireless communication link(s), such as to end users accessing server 310 data over the network 305 using a personal laptop 350. Personal laptop 350 is similar to laptop computer 108 of FIG. 1. In certain embodiments, personal laptop 350 is a desktop computer, a mobile device (similar to mobile device 106 of FIG. 1) a tablet or any other computing device. The communication interface can allow the server 310 to receive the location information from the tracking device 320. In another example, the communication interface can allow the server 310 to receive the location information from the tracking device 320 through the gateway 330 via a short-range communication 340. In certain embodiments the short-range communication 340, is a communication between tracking device 320 and the gateway 330 similar to communication 210 of FIG. 2. In certain embodiments, the server 310 transmits reconfiguration data to the gateway 330. The reconfiguration data allows the gateway to reconfigure the tracking device 320 using a local, short-range communication 340. The reconfiguration can include how often the tracking device 320 determines its location and transmits the information to the server 310. The reconfiguration can include processes the tracking device 320 is to follow when the tracking device 320 is unable to determine its location or communicate with the server, or both. The reconfiguration can include changes to operating modes, or even software or firmware uploads to be used by the tracking device 320. In certain embodiments, the server 310 can receive from the gateway 330, identifying information of the tracking device 320, when the gateway 330 registers or first observes a tracking device. In certain embodiments, the server 310 is capable of sending specific instructions to gateway 330. The instructions can be for any tracking device 320 within proximity to the gateway 330, for a specific set of tracking devices 320 within proximity to the gateway 330, or a single tracking device 320 within proximity to the gateway 330. The instructions can also be for any tracking device currently within proximity of the gateway 330, or an ongoing command for future tracking devices that are detected by the gateway when a new tracking device 320 enters the proximity of the gateway 330. For example, when the system architecture includes multiple tracking devices 320, the gateway 330 is able to perform configuration changes to all tracking device 320 within proximity for short-range communication 340. For instance, if the gateway 330 detects five tracking devices 320 (similar to tracking device 320), the gateway 330 can communicate with all the tracking devices by transmitting a universal command or instructions. When the gateway 330 detects a new tracking device 320, the gateway can transmit the instructions that were previously transmitted to the five tracking devices, to the new tracking device. The command can include an update of the firmware. Similarly, the command can include instructions for reconfiguring when all the tracking devices transmit their locations. In another example, when the system architecture includes multiple tracking devices 320, gateway 330 is able to perform configuration changes to specific tracking device 320 within proximity for short-range communication 340. For instance, if the gateway 330 detects five tracking devices (similar to tracking device 320), the gateway 330 can communicate with three of the five tracking device, and transmit a universal command or instructions to the three selected tracking devices. The command can include instructions to update firmware for specific tracking devices. Selecting the subset of the tracking devices can be preselected by the server 310, or a general command such as upon detecting a specific tracking device(s) perform a specific function, such as deactivating the tracking device, or reconfiguring when the tracking device transmits its location, or updating the firmware of the specific tracking devices, and the like.

In certain embodiments, server 310 can receive signal strength parameter associated with location of a tracking device 320, when the location information is received from the gateway 330. For example, if a gateway 330 receives location information from a tracking device 320, the gateway 330 forwards the received information onto the server 310. When the gateway 330 forwards the received information onto the server 310, the gateway 330 can include a signal strength parameter that indicates the strength of the received signal from the tracking device 320. The signal strength parameter can beneficial to the server 310, when multiple gateways 330 receive the location information from a tracking device 320. For example, if the tracking device transmits a null location message and two gateways 330 receive the message, each gateway 330 can send the message to the server 310 with augmented location of the associated gateway 330. When each gateway transmits the augmented location information of a single tracking device 320, the asset appears to the server 310 to be moving back and forth in a storage facility. Therefore, if the two gateways 330 transmit a signal strength parameter associated with the tracking device 320, the server can determine which received message is stronger. Once the server determines which received signal message is stronger, the server 310 can disregard the weaker message; and ascertain the asset is located closer to one gateway 330 in preference to second gateway and use the augmented location that is closest to the tracking device 320. This example is discussed further with reference to FIG. 6, below.

The information repository 312 represents any structure (s) capable of storing and facilitating retrieval of information (such as data, program code, or other suitable information on a temporary or permanent basis). The information repository 312 can include a memory and a persistent storage. Memory can be RAM or any other suitable volatile or non-volatile storage device(s), while persistent storage can contain one or more components or devices supporting longer-term storage of data, such as a ROM, hard drive, Flash memory, or optical disc. Information repository 312 stores location information of each tracking device 320 and may store an asset identifier or group of asset identifiers with which each tracking device 320 is associated.

Tracking device 320 represents one or more tracking devices used to remotely track assets. The tracking device 320 is discussed in greater detail below with reference to FIG. 4. The tracking device 320 is configured to be affixed to an asset for tracking and monitoring the location of the asset. For example, if the asset is delayed in transit from location A to location B, an operator monitoring the location of the tracking device 320 can identify the delay, and take corrective action. In another example the tracking device 320 allows an operator to find the asset associated with the tracking device 320 when the asset is located in a shipping yard, storage facility storage yard, in transit, or the like. The tracking device 320 can include a power source such as a battery. The tracking device 320 can also include a location module 322, a communication unit 324, an information repository 326, and a tracking agent 328.

In certain embodiments, the tracking device 320 has two states: a dormant state and an active state. In the dormant state, the tracking device 320 is powered down to reserve power. In the active state, the tracking device 320 requests location information via location module 322, derives the location of the tracking device 320, and transmits the location information via the communication unit 324. In certain embodiments, the location information is transmitted via a message.

The location module 322 derives location information of the tracking device 320 based on received geographical location information. In certain embodiments, location module 322 is a GNSS receiver, capable of communicating with multiple GPS satellites in order to determine the geographic location of the tracking device 320. In certain embodiments, the location module 322 can determine a location based on triangulating known radio signals such as WiFi, cellular, BLUETOOTH or other radio proximity methods. In certain embodiments, the location module 322 can determine a location based on detecting movement via one or more sensors.

Communication unit 324 provides communication between the tracking device 320 with the server 310 or the gateway 330 or both. In certain embodiments, the communication unit 324 is configured for one way communication. For example, the tracking device 320 can receive location information via the location module 322 and transmit the information via the communication unit 324, but may be unable to receive instructions from a third device, such as the server 310 or the gateway 330. If the communication unit 324 is configured for one way communication, then tracking device 320 is unable to ascertain whether the location message was received. Therefore, the communication unit 324 can transmit the message both the server via network 305 as well as to a gateway via short-range communication 340. By transmitting the message over two mediums provides an improved chance that the server 310 will receive the location message of the tracking device 320. In certain embodiments, the tracking device 320 is configured for two way communication. For example, the tracking device 320 can receive location information via the location module 322, and transmit the information as well as receive instructions from a third device, such as the server 310 or the gateway 330, via the communication unit 324. The instructions can change parameters and configurations of the electronic device. For example, instructions can include one or more: (i) post configuration changes; (ii) maintenance tasks; (iii) instructions to perform a self-diagnostic test and transmit the results; (iv) retrieve historical operational data of the tracking device for a specific date range or the life of the tracking device 320; (v) re-flash the tracking device with a set of new firmware, such that the tracking device 320 is firmware-over-the-air capable, and the like. In certain embodiments, even when the communication unit 324 is configured for two way communication, two messages are transmitted via network 305 as well as short-range communication 340.

In certain embodiments, the communication unit 324 is configured to transmit data to a server 310 via a satellite communication. When the communication unit 324 communicates with the server 310, the communication unit 324 can use various communication frequencies intended for large distances. In certain embodiments, the communication unit 324 is configured to transmit data to a local gateway. The communication unit 324 can use various communication frequencies intended for short distances. In certain embodiments, the communication unit 324 is configured to transmit data to a local gateway, when the tracking device 320 is unable to communicate with the server 310 (such as through satellite communication) via communication unit 324, or unable to communicate with a location service, such as GNSS, via the location module 322. In certain embodiments the communication unit 324 is configured to transmit a location message to both a local gateway and to the network 305 regardless if the tracking device 320 is able to communicate with the server 310 (such as through satellite communication), or able to ascertain a location via the location module 322.

Information repository 326 is capable of saving location information from the location module 322. The information repository 326 represents any structure(s) capable of storing and facilitating retrieval of information (such as data, program code, or other suitable information on a temporary or permanent basis).

Tracking agent 328 is capable of controlling the various tracking capabilities of the tracking device 320. In certain embodiments, the tracking agent 328 controls the active state and the dormant state of the tracking device 320. For example, based on a given time period, the tracking agent 328 can activate the tracking device 320 from a dormant state and initiate the location acquisition process via location module 322.

In certain embodiments, the tracking agent 328 is capable of instructing the communication unit 324 to transmit the location information message, to the server 310, via network 305, or to the gateway 330, via a short range communication frequency. For example, if the location module 322 is able to derive the location of the tracking device, then the tracking agent 328 can instruct the communication unit 324 to transmit the location information in a message to the server 310. If the communication unit 324 is unable to communicate with the server 310, the tracking agent 328 can instruct the communication unit 324 to transmit the location information message to the gateway 330. If the location module 322 is unable to derive the location of the tracking device, the tracking agent 328 can instruct the communication unit 324 to transmit a blank location, such as a null location, in a message to the gateway 330. In certain embodiments, the communication unit 324, when communicating with the gateway 330, can use a short range frequencies, such as BLUETOOTH, BLE, ZIGBEE, RFID, message protocols or advertising. The communication unit 324, when communicating with the gateway 330, can use short-range communication 340.

In certain embodiments, if the location module 322 is unable to derive the location of the tracking device or the communication unit 324 is unable to communicate with the server 310, the tracking agent 328 can instruct the communication unit 324 to repeatedly broadcast the location message using a short range frequency, such as short-range communication 340. It is noted that if the communication unit 324 is a one way communication, then the communication unit 324 does not receive a notification that a message was received. Therefore, in certain embodiments, the communication unit 324 always repeatedly broadcasts the location message using a short range communication method. The broadcast is repeated in order for a gateway 330 to pick up the broadcast. For example, if the tracking device 320 is moving, there is a possibility that no gateway is nearby to receive the message; therefore, by continually repeating the message, a gateway 330 will eventually receive the message. In another example, the tracking device 320 is stationary and the gateway 330 is mobile. For instance, the tracking device is located such as in a shipping yard, while a gateway 330 attached to a vehicle. When the vehicle drives within the proximity of the tracking device 320, such as within the range of the short-range communication 340, the gateway 330 is able to receive the broadcast from the tracking device 320. In certain embodiments, if the location is unknown, the broadcast can include the last known location as saved in the information repository 326. In certain embodiments, when transmitting the repeated broadcast, the tracking device 320 does not know when or if the broadcast is received by a gateway 330. If the tracking device 320 is capable of two-way communication and receives a silent command via a gateway 330, the silent command can instruct the tracking agent 328 to pause radio operations for a period of time, thus preserving battery capacity of the tracking device 320. Alternatively, if the tracking device 320 is capable of only one-way communication, the tracking agent 328 can stop broadcasting the message for a period of time and then issue a command to continue broadcasting the message. The starting and stopping of the broadcast can continue until the tracking device is able to communicate with the server 310 or the gateway 330.

Gateway 330 represents one or more devices that can be used to communicate with tracking device 320 and the server 310. In certain embodiments, the gateway 330 serves as (i) a scanning device, (ii) a connection method for the tracking device 320, (iii) an alternate communication path for the tracking device 320, (iv) bandwidth reduction instrument, (v) an apparatus to register an unregistered tracking device 320, or (vi) a radio silent controller for power savings in nearby tracking devices 320, or a combination thereof. Gateway 330 can be stationary or mobile. For example, gateway 330 is located at a stationary position such as when the gateway 330 is affixed on or near a building. In another example, gateway 330 mobile when it is affixed to a vehicle.

In certain embodiments, the gateway 330 is located within a short range communication distance with one or more tracking devices 320. In certain embodiments, the gateway 330 is mobile as it is located on a moving vehicle that when the vehicle is moved can be located within a short range communication distance with one or more tracking devices 320. The gateway 330 is configured to be located in a location that provides an unobstructed view (or predominantly unobstructed view) to one or more communication satellites, one or more location acquisition satellites. For example, if the tracking device 320 is unable to communicate directly with the server 310, via network 305, such as when the tracking device is inside a building, obscured by other assets, or in a covered cargo transportation vehicle, then the tracking device 320 can transmit the location message via a short range communication to the gateway 330. The gateway 330 then forwards the received message to the server 310, via network 305. In another example, the gateway 330 is located outside of a transportation vehicle while the tracking device 320 is located inside a covered portion of the transportation vehicle. If the tracking device 320 is unable to transmit location information to server 310, due to an inability to ascertain a location or an ability to communicate with a network 305, the tracking device 320 can transmit the location message to the gateway 330. The gateway 330 then forwards the location message onto the server 310. In another example, the gateway 330 is located on a vehicle, such as a forklift, that drives through a storage yard. When the vehicle with the gateway 330 approaches tracking device 320, the tracking device 320 can transmit the message to the gateway 330. For instance, the tracking drive could continually broadcast the location message that is received by the moving gateway. The gateway 330 includes a location module 332, a communication unit 334, an information repository 336, and a tracking program 338.

The location module 332 of the gateway 330 is similar to the location module 322 of the tracking device 320. For example, the location module 332 is capable of deriving the location of the gateway 330. In certain embodiments, gateway 330 does not include a location module 332. For example, if the gateway is stationary, such as affixed to a storage facility, the gateway can be preset with a location. In another example, when the gateway is stationary, when the gateway transmits the location message of the tracking device 320, the gateway can include the identification number of the gateway 330. The information repository 312 within server 310 can include an estimated geographic location such as an address or an area within a building where the gateway 330 is located. Thereafter the server 310 can augment the null location of the tracking device 320 with the approximate location of the gateway 330.

The communication unit 334 of the gateway 330 is similar to the communication unit 324 of the tracking device 320. For example, the communication unit 334 provides communication between the gateway 330, the server 310, and the tracking device 320. In certain embodiments, the gateway 330 is configured for two-way communication. For example, the gateway 330 can receive a location message from the tracking device 320 and transmit the message to the server 310. The gateway 330 is also capable of receiving instructions from the server 310 and receiving location information from one or more satellites. In certain embodiments, the gateway 330 can receive instructions from the server 310 and forward the received instructions to the tracking device 320.

In certain embodiments, short-range communication 340, between the tracking device 320 and the gateway 330, represents a short range communication via communication unit 324 with communication unit 334. Short-range communication 340 occurs when the communication unit 324 is unable to communicate with network 305. For example, the tracking device 320 can be located in a covered storage facility that prevents the communication unit 324 from communicating directly with network 305. Short-range communication 340 can also occur when the gateway 330 receives instructions or configuration changes from server 310. Short-range communication 340 can also occur when the gateway 330 registers an unregistered tracking device 320.

The information repository 336 of the gateway 330 is similar to the information repository 326 of the tracking device 320. The information repository 336 represents any structure(s) capable of storing and facilitating retrieval of information (such as data, program code, or other suitable information on a temporary or permanent basis). The information repository 336 is capable of saving location information. In certain embodiments, the information repository 336 is capable of saving location information associated with each tracking device 320 that gateway 330 communicates with.

The tracking program 338 of the gateway 330 is similar to the tracking agent 328 of the tracking device 320. The tracking program 338 is capable of controlling the various tracking capabilities of the gateway 330. For example, if the gateway 330 receives a message from the tracking device 320 with a null location, the gateway 330 can then augment the received message with the location information of the gateway 330. The location information of the gateway 330 is received from the location module 332 or the gateway 330 can be preprogrammed with a particular location. In another example, the gateway 330 can augment the received message with the identification number of the gateway. If the gateway is stationary, such as affixed to a building, the server 310 can augment location of the gateway based on matching the identification number of the gateway 330 with a location as maintained in the information repository 312. Additionally, the gateway 330 can include the signal strength of the received message with the location information message is transmitted to the server 310.

In certain embodiments, the gateway 330 is capable of registering an unregistered tracking device. For example, the gateway 330 can perform the registration of the tracking device 320 when tracking device 320 is unregistered or not assigned to an asset, or both. The gateway 330 can allow a user to (i) select the identification number of the tracking device, (ii) select a particular configuration of the tracking device, (iii) bind the tracking device 320 to an asset, (iv) override any default or preconfigured settings, and the like.

In certain embodiments, the tracking program 338 is also capable of deriving the signal strength of a received broadcast from a tracking device 320. When the gateway 330 transmits a location message from the tracking device, the transmitted location message can include the signal strength.

In certain embodiments, the tracking program 338 is capable of transmitting a silent command to a tracking device 320 that continually repeats a broadcast. In certain embodiments, the tracking device 320 repeats a broadcast if the tracking device is unable to access the server 310 or derive a location via location module 322. The silent command is limited in duration. Upon receiving the silent command, the tracking device 320 engages a low-power state and may cease network communication attempts for a period of time. Therefore, if the tracking device 320 is moved and can no longer communicate with the gateway 330, the silent command will conclude after the period of time, thereby allowing the tracking device 320 to resume functioning as configured. The silent command provides power saving means for tracking devices that are located in areas with limited or no network operation, thereby extending the service life of the device.

In certain embodiments, the tracking program 338 is capable of reducing the number of messages the gateway transmits. That is, if the tracking device 320 repeats a broadcast, the tracking program 338, can prevent the gateway for transmitting a message each time the gateway receives the broadcast. For example, the tracking program 338 can employ a straight decimation ratio, to reduce the number of transmission by the gateway. A decimation ratio reduces the communication forwarding rate of a received signal. That is, the tracking program 338 approximates a sequence that can be obtained by sampling the signal at a lower rate. In another example, the tracking program 338 can employ an age criteria, such as a time window, to reduce the number of transmission by the gateway. A time window limits the number of transmissions within a given period of time. For example, if the gateway 330 receives X number broadcast messages from the same tracking device within a specified period of time, the tracking program 338 can transmit the first received message to the server and retain the reminder of the messages until the period of time expires. Thereafter the tracking program 338 transmits a single broadcast.

Figure 4:
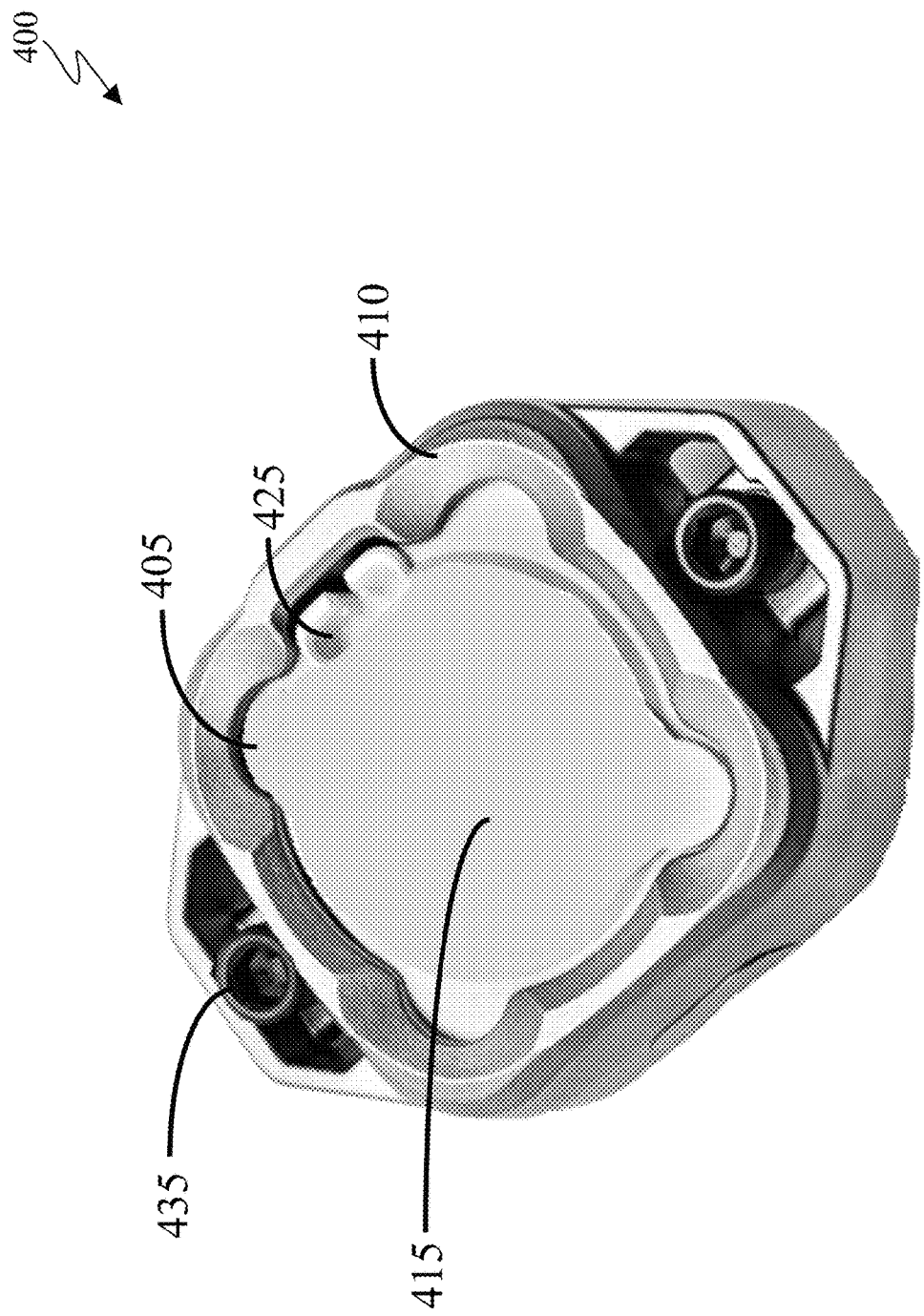
FIG. 4 illustrates an example tracking device in accordance with an embodiment of the present disclosure.

FIG. 4 illustrates an example tracking device 400 in accordance with an embodiment of this disclosure. As shown in FIG. 4, the tracking device 400 includes a control unit 405 and a hardened case 410. The hardened case 410 is configured to protect the control unit 405 during deployment in the field. The hardened case 410 inhibits damage to the control unit 405, such as by helping to prevent damage from compression, impact, and weather. The hardened case 410 can be formed from any suitable material(s), such as a zinc alloy, steel, stainless steel, plastic, fiberglass, and the like. In certain embodiments, the material used to form the hardened case 410 is anti-magnetic and/or non-sparking. In certain embodiments, the hardened case 410 prevents water or other liquids from contacting or entering into the control unit 405.

The tracking device 400 includes a window 415 configured to allow transmission of wireless signals to and from the control unit 405. The wireless signals can include long-range RF signals, such as cellular wireless signals or satellite communication signals. The wireless signals can also be short-range radio frequency such as BLUETOOTH, BLUETOOTH LOW ENERGY (BLE), WiFi, ZIGBEE, Radio Frequency identification (RFID), or other signals. In certain embodiments, the window 415 is dimensioned to focus wireless signals towards a transceiver in the control unit 405.

The tracking device 400 further includes a switch 425 that enables an operator to activate or deactivate the tracking device 400. The switch 425 is coupled to the processing circuitry or other components within the control unit 405. The switch 425 represents any suitable type of switch, such as a magnetic switch.

The tracking device 400 is adapted to be removably mounted to a container, asset or other structure. For example, the tracking device 400 can include a mounting mechanism for attaching the tracking device 400 to a number of different types of containers, tools, equipment, or machinery. For example, the tracking device 400 can be mounted using one or more hex-head screws, socket-head cap screws, hex-head self-tapping screws, Phillips-head self-tapping screws, stainless steel banding straps, zip-ties, VHB tape, and/or magnetic mountings. In another example, the hardened case 410 can include a number of openings 435 configured to receive screws, such as hex-head screws or socket-head cap screws. The tracking device 400 can also be mounted via a standard mounting, a flush mounting, adhesive tape, or some other mounting technique. In certain embodiments, the tracking device 400 is mounted without the protective hardened case 410.

Figure 5:
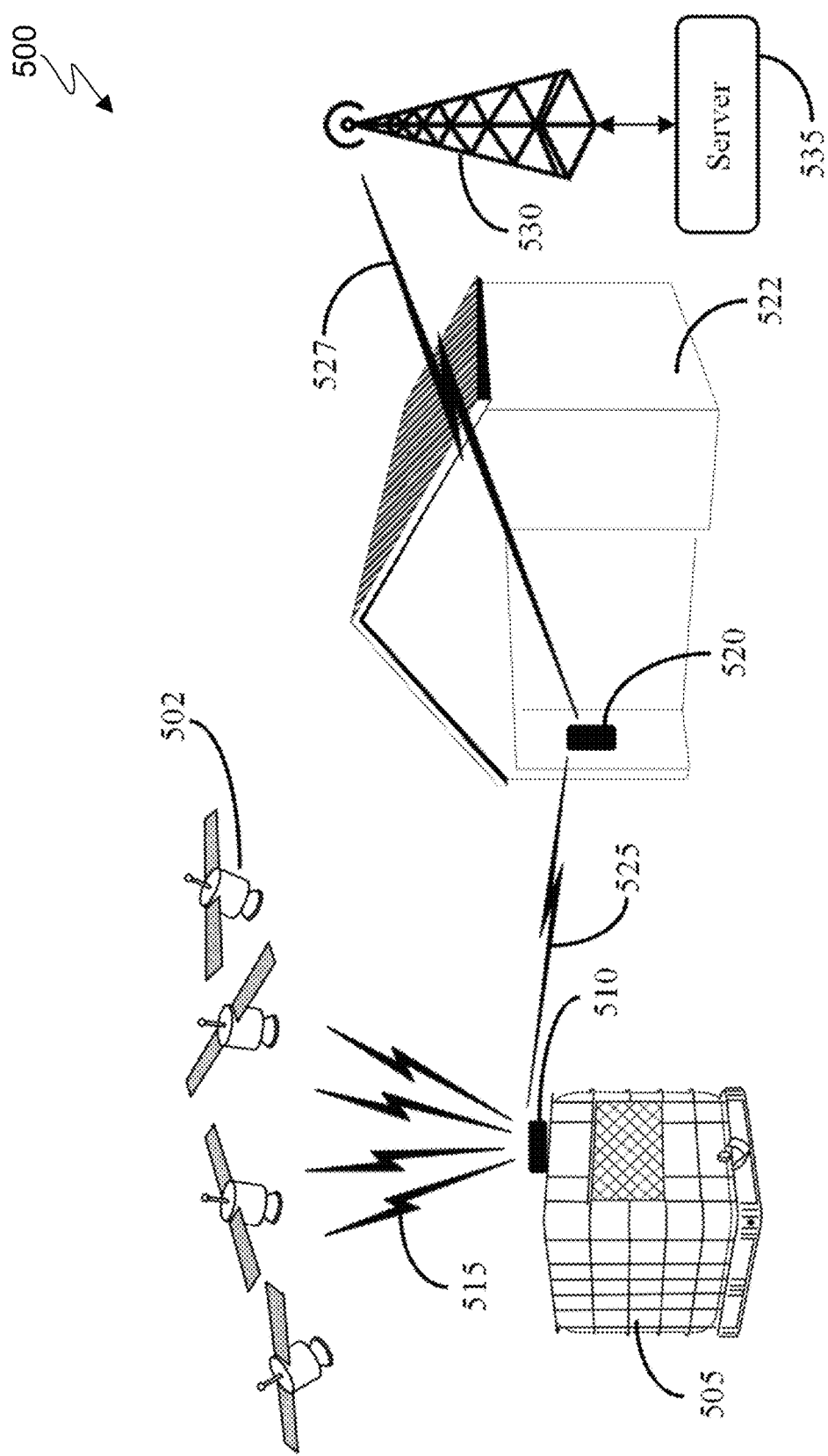
FIG. 5 illustrates an example global tracking and reporting system in accordance with an embodiment of the present disclosure.

FIG. 5 illustrates an example global tracking and reporting system in accordance with an embodiment of this disclosure. FIG. 5 illustrates environment 500, depicting a tracking and reporting system of assets. The embodiment of the environment 500 shown in FIG. 5 is for illustration only. Other embodiments could be used without departing from the scope of the present disclosure.

Tracking device 510 is affixed to an asset 505. The asset 505 represents the equipment or machinery that is to be tracked. For example, asset 505 can be packaged individually or grouped in containers such as a box, a crate, a tank, a pallet, and the like. Tracking device 510 is similar to tracking device 110 of FIG. 1, tracking device 201 of FIG. 2, tracking device 320 of FIG. 3, and tracking device 400 of FIG. 4.

Gateway 520 is affixed to a building 522. Building 522 represents a covered storage facility, an open storage yard, a vehicle, and the like. The gateway 520 is similar to gateway 112 of FIG. 1, gateway device 230 of FIG. 2, and gateway 330 of FIG. 3.

Server 535 receives data originating from the tracking device 510. Server 535 is similar to server 104 of FIG. 1, server 275 of FIG. 2, and server 310 of FIG. 3.

Tracking device 510 attempts to ascertain its location using global navigation satellites 502 via communication 515. The location information indicates a geographical location of the tracking device and the associated asset 505. In certain embodiments, tracking device 510 transmits the location information directly to communication tower 530. In certain embodiments, tracking device 510 transmits the location information to the gateway 520, via communication 525. For example, tracking device 510 transmits the location information to the gateway 520, when the tracking device 510 is unable access the communication tower 530. In another example, tracking device 510 routinely transmits a burst signal containing location data that is received by any nearby gateway devices 520, regardless of the tracking device ability to communicate with communication tower 530 directly. In another example, tracking device 510 transmits the location information to the gateway 520, when the tracking device 510 detects a gateway. Communication 525 can be BLUETOOTH, BLE, WiFi, ZIGBEE, Radio Frequency identification (RFID), or other short range signals.

In certain embodiments, the gateway 520 transmits the received location information from the tracking device 510 to the communication tower 530. In certain embodiments, if the tracking device 510 is unable to communicate with the global navigation satellites 502 via communication 515 or if the tracking device 510 is unable to communicate with the communication tower 530, then the tracking device 510 can transmit a message to the gateway 520. For example, if the tracking device 510 is unable to obtain location information via the global navigation satellites 502, then the message that the tracking device 510 transmits to the gateway, via communication 525, includes a null location. The null location can be a blank location, a location designated by a specific string, or a predetermined designation that indicates an inability to determine a location. Thereafter, the gateway 520 can augment the message with the identification number of the gateway 520, a preprogrammed location of the gateway 520, or the gateway can attempt to communicate with the global navigation satellites 502, to provide an approximate location of the asset 505. The identification number of the gateway 520 allows the server 535 to match the asset with the gateway 520 to determine an approximate location of the asset. The preprogrammed location of the gateway 520 allows the server to approximate the location of the asset based on the location of the gateway 520. The gateway 520 can be preprogrammed with a geographical location, since the gateway 520 is located on a nonmoving structure such as building 522.

The gateway 520 then transmits the location message of the tracking device 510 to the communication tower 530 via communication 527. The communication 527 can be a satellite WAN, a cellular WAN, a satellite uplink, ethernet, or internet based, such as through a Wi-Fi signal. The communication tower 530 then transfers the location message of the tracking device to the server 535. Server 535 manages and tracks the location of each asset. In certain embodiments, sever 353 estimates the location of the tracking device 510 (and the associated asset 505) based on the location of the gateway 520. For example, if the communication 525 is a short range communication that has a limited distance, such as BLUETOOTH BLE, ZIGBEE, or RFID, the tracking device 510 must be within a limited area from the gateway 520.

Figure 6:
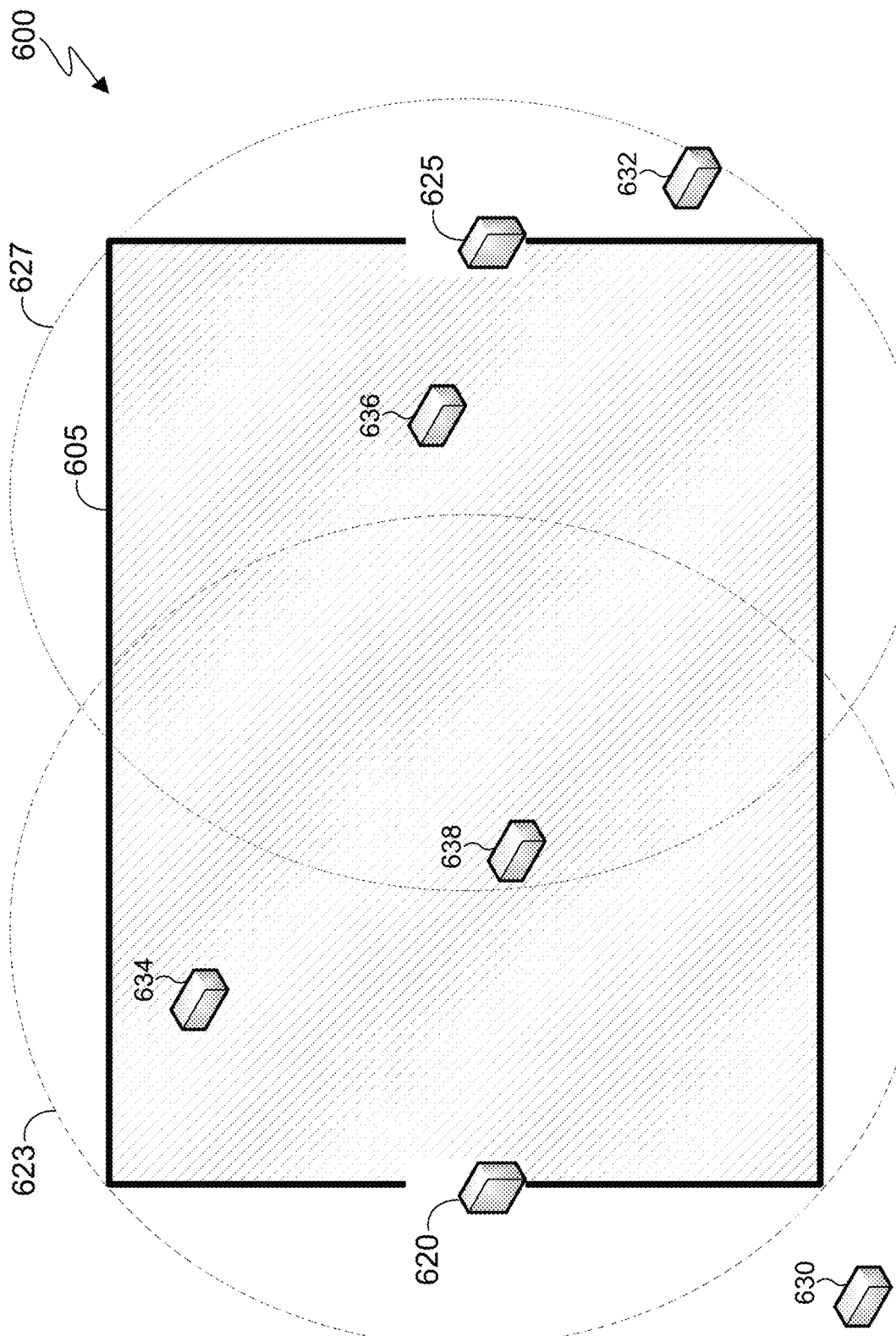
FIG. 6 illustrates an example global tracking system with two gateways in accordance with an embodiment of the present disclosure.

FIG. 6 illustrates an example global tracking system with two gateways in accordance with an embodiment of this disclosure. FIG. 6 illustrates environment 600 depicting a tracking and reporting system of assets with multiple gateways. The embodiment of the environment 600 shown in FIG. 6 is for illustration only. Other embodiments could be used without departing from the scope of the present disclosure.

Tracking devices 630, 632, 634, 636, and 638 are each affixed to an asset. Tracking devices 630-638 are similar to tracking device 110 of FIG. 1, tracking device 201 of FIG. 2, tracking device 320 of FIG. 3, tracking device 400 of FIG. 4, and tracking device 510 of FIG. 5.

Gateways 620 and 625 are affixed to building 605. Gateways 620 and 625 are similar to gateway 112 of FIG. 1, gateway device 230 of FIG. 2, gateway 330 of FIG. 3, and gateway 520 of FIG. 5. Gateway 620 includes a communication range of 623 for short range communication, such as BLUETOOTH, BLE, WiFi, ZIGBEE, Radio Frequency identification (RFID), or other short range signals. Similarly, gateway 625 includes a communication range of 627 for short range communication, such as BLUETOOTH, BLE, WiFi, ZIGBEE, Radio Frequency identification (RFID), or other short range signals.

Tracking device 630 is located outside building 605 and not within the communication range 623 of gateway 620 or the communication range 627 of the gateway 625. Tracking device 630 communicates directly with the server to report its location via a wide area network as previously discussed similar to network 305 and server 310 of FIG. 3.

Tracking device 632 is located outside building 605 and within the communication range 627 of the gateway 625 but also likely in communication range of the tracking device 632 WAN interface. Tracking device 630 can communicate directly with the server via its WAN interface or with gateway 625 to report its location. In certain embodiments, tracking device 632 first attempts to communicate with the server via the WAN. If the tracking device 632 is unable to derive its location or unable to communicate with a server, then the tracking device 632 communicates a null location to the gateway 625. In yet another implementation, tracking device 632 communicates with the server via its WAN interface and also sends the same information through the gateway 625. In certain embodiments the gateway 625 can the time employ a straight decimation ratio, employ a time window, or issue a silent command to the tracking device 632 to limit the number of messages sent to the server for processing.

Tracking device 634 is located inside building 605 and within the communication range 623 of the gateway 620. If tracking device 634 is unable to derive a geographical location due to being located inside building 605, the tracking device can transmit a null location to gateway 620 via communication range 623. The gateway 620 can determine the signal strength of the received message from the tracking device 634. Upon receiving the message with the null location, the gateway 620 augments the location of the tracking device 634 with the location or identity of the gateway 620, prior to transmitting the message to the server. The gateway 620 then transmits the augmented message and the signal strength of the received message from the tracking device 634. In certain embodiments the gateway 620 can employ a straight decimation ratio, employ a time window or age criteria, or issue a silent command to the tracking device 634 to limit the number of messages sent to the server for processing.

Tracking device 636 is located inside building 605 and within the communication range 627 of the gateway 625. If tracking device 636 is unable to derive a geographical location due to being located inside building 605, the tracking device can transmit a null location to gateway 625 via communication range 627. The gateway 625 can determine the signal strength of the received message from the tracking device 636. Upon receiving the message with the null location, the gateway 625 augments the location of the tracking device 636 with the location or identity of the gateway 625, prior to transmitting the message to the server. The gateway 625 then transmits the augmented message and the signal strength of the received message from the tracking device 636. In certain embodiments the gateway 625 can employ a straight decimation ratio, employ a time window or age criteria, or issue a silent command to the tracking device 636 to limit the number of messages sent to the server for processing.

Tracking device 638 is located inside building 605 and within the communication range 623 of the gateway 620 and communication range 627 of the gateway 625. If tracking device 636 is unable to derive a geographical location due to being located inside building 605, the tracking device can transmit a null location. The transmitted message can be received by both gateway 620 and gateway 625 via communication range 623 and communication range 627, respectively. The gateway 620 can determine the signal strength of the received message from the tracking device 638. Similarly, the gateway 625 can determine the signal strength of the received message from the tracking device 638. Upon receiving the message with the null location, both gateway 620 and gateway 625 augments the location of the tracking device 638 with the location or identity of the each gateway respectively, prior to transmitting the message to the server. Each gateway then transmits the augmented message and the signal strength of the received message from the tracking device 638. The server may then use the location of either gateway device 620 or 625 based on received signal strength or other methods for determining closest proximity to the tracking device 638.

Figure 7:
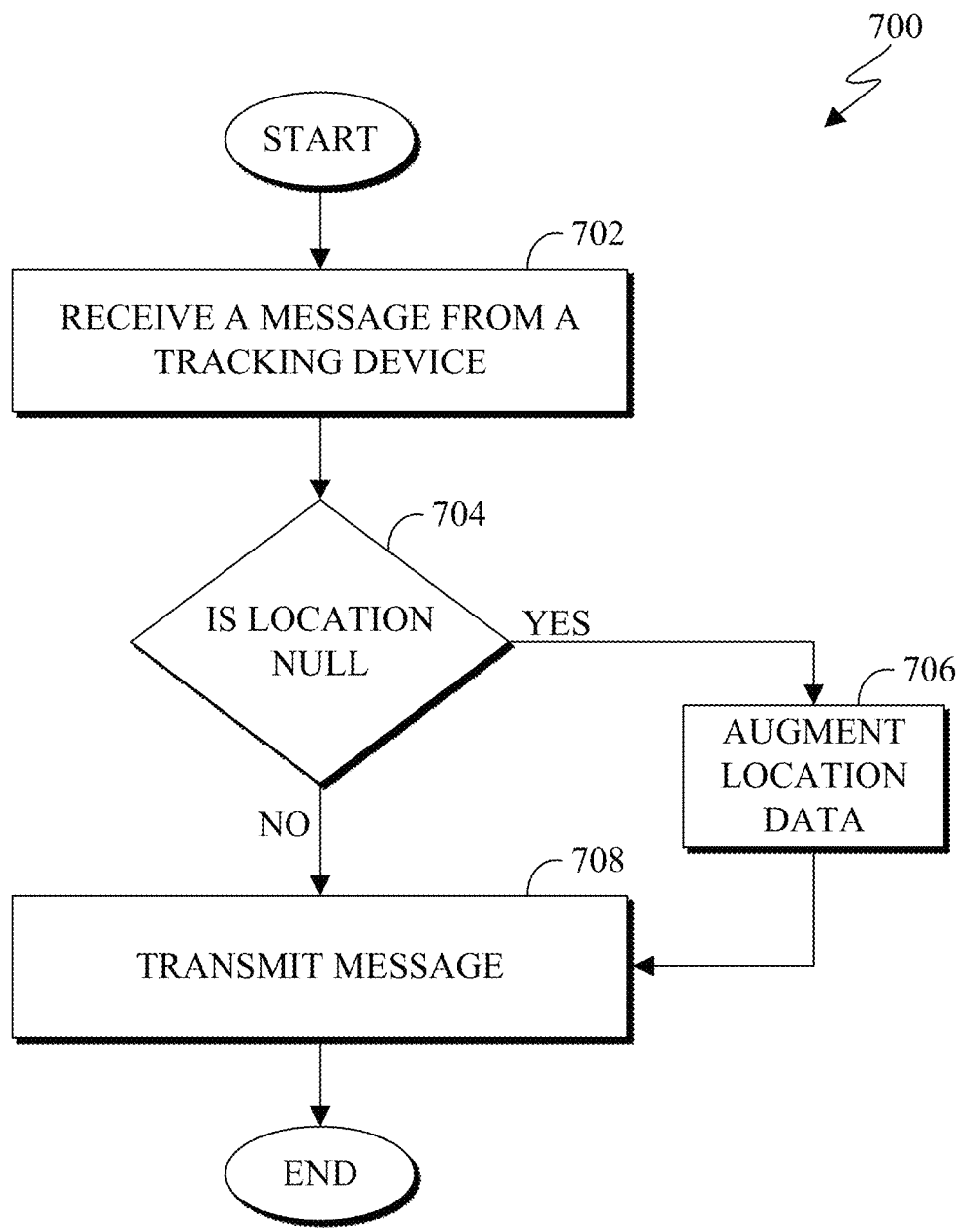
FIG. 7 illustrates a method for receiving a message from a tracking device by a gateway in accordance with an embodiment of the present disclosure.

FIG. 7 illustrates a method for receiving and processing a message from a tracking device by a gateway in accordance with an embodiment of this disclosure. FIG. 7 does not limit the scope of this disclosure to any particular embodiments. While process 700 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the method receiving a location message described with respect to the gateway 112 of FIG. 1, the gateway device 230 of FIG. 2 and gateway 330 of FIG. 3. The process 700 is an amplification of the tracking program 338 of FIG. 3, however, the process 700 can be used with any other suitable system.

In block 702, the tracking program 338 receives a message from a tracking device associated with an asset. In certain embodiments, the received message includes an identification parameter associated with the tracking device. In certain embodiments, the tracking program 338 derives a signal strength parameter associated with the received message.

In decision 704, the tracking program 338 determines whether the received message indicates a location of the tracking device. For example, the received message can include a blank or null location value of the received message. In another example, the received message can include a geographic location of the received message. In certain embodiments, the tracking program 338 also determines whether the received message matches a previously received message.

If the tracking program 338 determines that the received message indicates a null location, then in block 706 the tracking program 338 augments the received message. For example, the tracking program 338 augments the received message with location information of the electronic gateway device. In another example, the tracking program 338 augments the received message with identification information of the electronic gateway device.

If the tracking program 338 determines that the received message includes a location, or after the tracking program 338 augments the received message, then in block 708 the tracking program 338 transmits the message to the server. In certain embodiments when the message is transmitted to the server a signal strength parameter associated with the message, when the message is also transmitted to the server. The signal strength parameter indicates the strength of the received message from a tracking device. In certain embodiments, if multiple messages are received from the same tracking device within a period of time, the tracking program 338 limits the number transmissions that the gateway transmits to the server with respect to that tracking device. For example, the tracking program 338 can utilize an age criteria by sending the first received message to the server and then holding the remaining messages for a period of time. After the period of time, the tracking program 338 sends a single message selected from the held messages. The selected message can be the second received message, the last received message or a randomly selected message.

Figure 8:
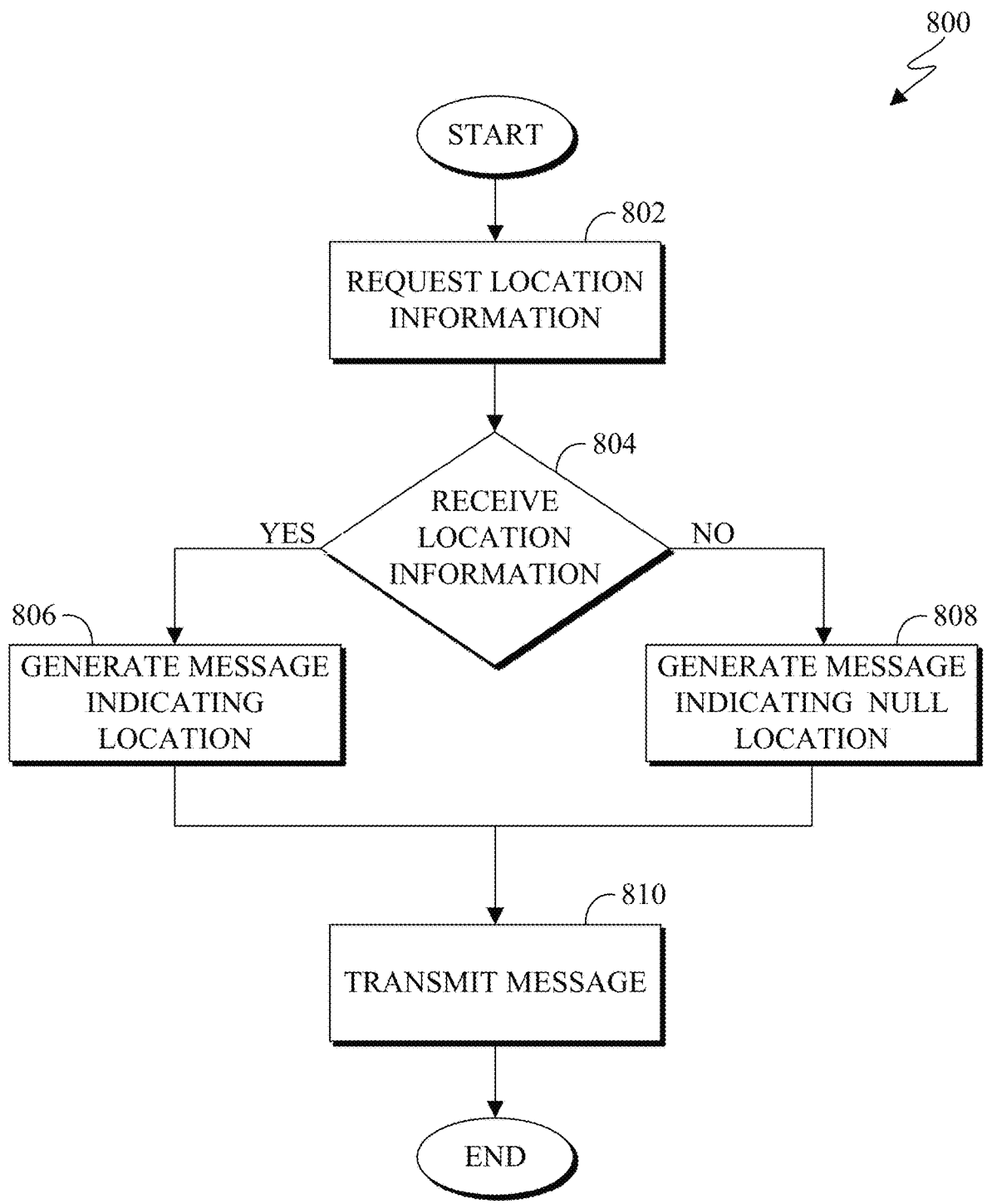
FIG. 8 illustrates a method for a transmitting location information by a tracking device in accordance with an embodiment of the present disclosure.

FIG. 8 illustrates a method for a tracking device to transmit a location message in accordance with an embodiment of this disclosure. FIG. 8 does not limit the scope of this disclosure to any particular embodiments. While process 800 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the method transmitting a location message described with respect to the tracking device 110 of FIG. 1, the tracking device 201 of FIG. 2 and tracking device 320 of FIG. 3. The process 800 is an amplification of the tracking agent 328 of FIG. 3, however, the process 800 can be used with any other suitable system.

In block 802, the tracking agent 328 requests request location information of the tracking device. The tracking agent 328 can request the location of the tracking device through a GNSS receiver. The tracking agent 328 can request or ascertain the location of the tracking device through a cellular receiver or any other location determination means.

In decision 804, the tracking agent 328 determines whether location information was received. If the location information was received, then in block 806 the tracking agent 328 generates a message that indicates the location of the tracking device. If the location information was not received, then in block 808 the tracking agent 328 generates a message that indicates a null location. In certain embodiments when the tracking agent 328 generates a message, the message also includes a previous location of the tracking device.

In block 810, the tracking agent 328 transmits the generated message. The message may be transmitted to any communication method available for delivery to the remote server. The message may contain location information, or null location information as previously discussed, through a WAN interface, or a local area network interface, or both.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A tracking device comprising:
a location receiver configured to receive location information of the tracking device;
a communication unit configured to:
transmit through a wide area network,
transmit through a local area network, and
receive an operational command through the local area network, wherein the operational command represents at least one of a silent command, a reconfiguration command, and a registration command; and
a processor configured to:
attempt to ascertain the location information of the tracking device,
generate a first message, wherein when the location information is ascertained, the first message includes a location of the tracking device and when the location information is not ascertained, the first message includes a null location, and
generate a second message, wherein when the location information is ascertained, the second message includes the location of the tracking device and when the location information is not ascertained, the second message includes the null location,
wherein the communication unit is further configured to:
transmit the first message through the wide area network to a remote server when the wide area network is available, and
transmit the second message through the local area network to a local gateway device when the local area network is available,
wherein when the operational command representing the silent command is received, the processor is further configured to prevent network communication through the wide area network and the local area network for a period of time and upon an expiration of the period of time, transmit at least one of the first message and the second message, and
wherein when the operational command representing the reconfiguration command is received, the processor is further configured to reconfigure one or more predefined settings according to the reconfiguration command.

2. The tracking device of claim 1, wherein the processor is further configured to include a previous location of the tracking device in the second message when the location information is not received.

3. The tracking device of claim 1, wherein after receiving the silent command, the processor is configured to:
instruct the communication unit to stop transmitting through the communication unit for the period of time,
instruct the location receiver to stop receiving the location information for the period of time, and
stop the attempt to ascertain the location information.

4. The tracking device of claim 1, wherein the processor is configured to modify, based on the reconfiguration command, how often at least one of:
the location information is ascertained, and
at least one of the first message and the second message is transmitted.

5. The tracking device of claim 1, wherein when the operational command represents the registration command, the processor is configured to register the tracking device.

6. The tracking device of claim 1, wherein:
the wide area network is at least one of a satellite communication system or a cellular communication system, and
the local area network is at least one of a bluetooth communication system or a WI-FI communication system.

7. The tracking device of claim 1, wherein the processor is further configured to:
switch between a dormant state and an active state based on a predetermined time period or the operational command;
while the active state is activated, the processor is configured attempt to ascertain the location information, generate the first message and the second message, and transmit the first message and the second message; and
while the dormant state is activated, the processor is configured to reduce power consumption,
wherein the operational command is received from the remote server or the local gateway device, and
wherein when the operational command is received from the local gateway device the operational command originated from the local gateway device or the remote server.

8. A method comprising:
receive an operational command through a local area network, wherein the operational command represents at least one of a silent command, a reconfiguration command, and a registration command;
attempting to ascertain location information of a tracking device;
generating a first message, wherein when the location information is ascertained, the first message includes a location of the tracking device and when the location information is not ascertained, the first message includes a null location;
generating a second message, wherein when the location information is ascertained, the second message includes the location of the tracking device and when the location information is not ascertained, the second message includes the null location;
transmitting the first message through a wide area network to a remote server when the wide area network is available;
transmitting the second message through the local area network to a local gateway device when the local area network is available;

when the operational command representing the silent command is received preventing network communication through the wide area network and the local area network for a period of time;

upon an expiration of the period of time, transmitting at least one of the first message and the second message; and when the operational command representing the reconfiguration command is received, reconfiguring one or more predefined settings according to the reconfiguration command.

9. The method of claim 8, further comprising:
including a previous location of the tracking device in the second message when the location information is not received.

10. The method of claim 8, wherein after receiving the silent command, the method further comprises:
stopping the attempt to ascertain the location information; and
stopping the first message and the second message from transmitting for the period of time.

11. The method of claim 8, wherein the method further comprises modifying, based on the reconfiguration command, how often at least one of:
the location information is ascertained, and
at least one of the first message and the second message is transmitted.

12. The method of claim 8, wherein when the operational command represents the registration command, the method further comprises registering the tracking device.

13. The method of claim 8, wherein:
the wide area network is at least one of a satellite communication system or a cellular communication system, and
the local area network is at least one of a bluetooth communication system or a WI-FI communication system.

14. The method of claim 8, further comprising:
switching between a dormant state and an active state based on a predetermined time period or the operational command;
while the active state is activated, the location information is ascertained, the first message and the second message are generated, and the first message and the second message are transmitted; and
while the dormant state is activated, reducing power consumption,
wherein the operational command is received from the remote server or an electronic device, and
wherein when the operational command is received from the local gateway device the operational command originated from the local gateway device or the remote server.

15. A non-transitory machine-readable medium containing instructions that, when executed cause at least one processor of a tracking device to:
receive an operational command through a local area network, wherein the operational command represents at least one of a silent command, a reconfiguration command, and a registration command;
attempt to ascertain location information of the tracking device;
generate a first message, wherein when the location information is ascertained, the first message includes a location of the tracking device and when the location information is not ascertained, the first message includes a null location;
generate a second message, wherein when the location information is ascertained, the second message includes the location of the tracking device and when the location information is not ascertained, the second message includes the null location;
transmit the first message through a wide area network to a remote server when the wide area network is available;
transmit the second message through the local area network to a gateway device when the local area network is available;
when the operational command representing the silent command is received, prevent network communication through the wide area network and the local area network for a period of time;
upon an expiration of the period of time, transmit at least one of the first message and the second message; and
when the operational command representing the reconfiguration command is received, reconfigure one or more predefined settings according to the reconfiguration command.

16. The non-transitory machine-readable medium of claim 15, wherein the instructions when executed further cause the at least one processor to include a previous location of the tracking device in the second message when the location information is not received.

17. The non-transitory machine-readable medium of claim 15, wherein after receiving the silent command, the instructions when executed further cause the at least one processor to:
stop the attempt to ascertain the location information; and
stop the first message and the second message from transmitting for the period of time.

18. The non-transitory machine-readable medium of claim 15, wherein the instructions when executed further cause the at least one processor to modify, based on the reconfiguration command, how often at least one of:
the location information is ascertained, and
at least one of the first message and the second message is transmitted.

19. The non-transitory machine-readable medium of claim 15, wherein the operational command represents the registration command, the instructions when executed further cause the at least one processor to register the tracking device.

20. The non-transitory machine-readable medium of claim 15, wherein:
the wide area network is at least one of a satellite communication system or a cellular communication system, and
the local area network is at least one of a bluetooth communication system or a WI-FI communication system.

* * * * *